May 11, 1926.
H. E. RIGGLE
MUD LUG
Filed March 19, 1925
1,584,651
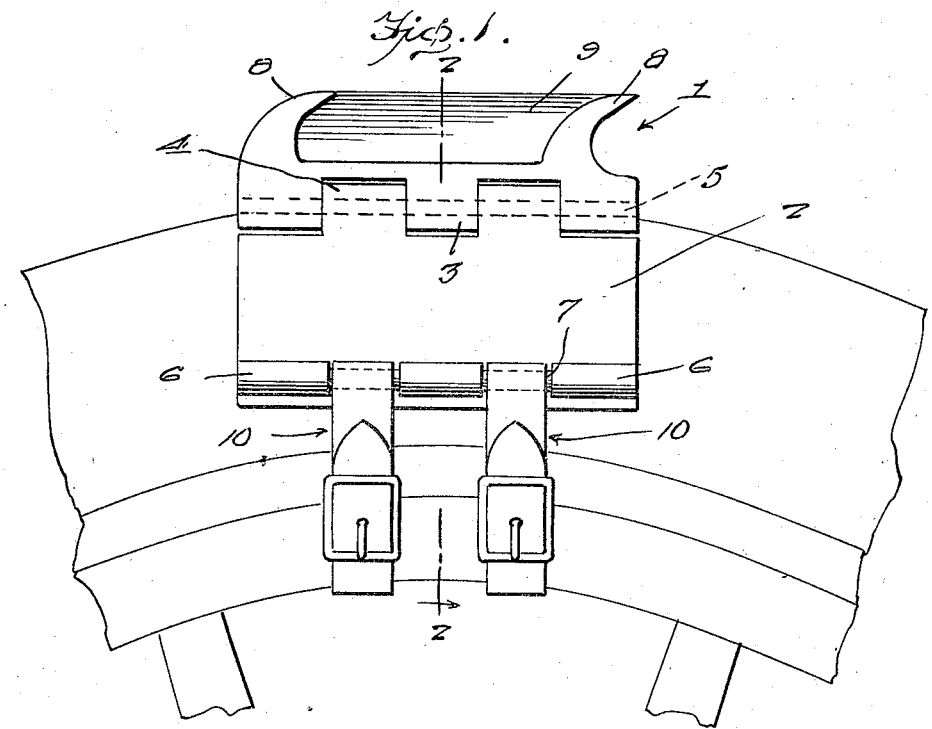
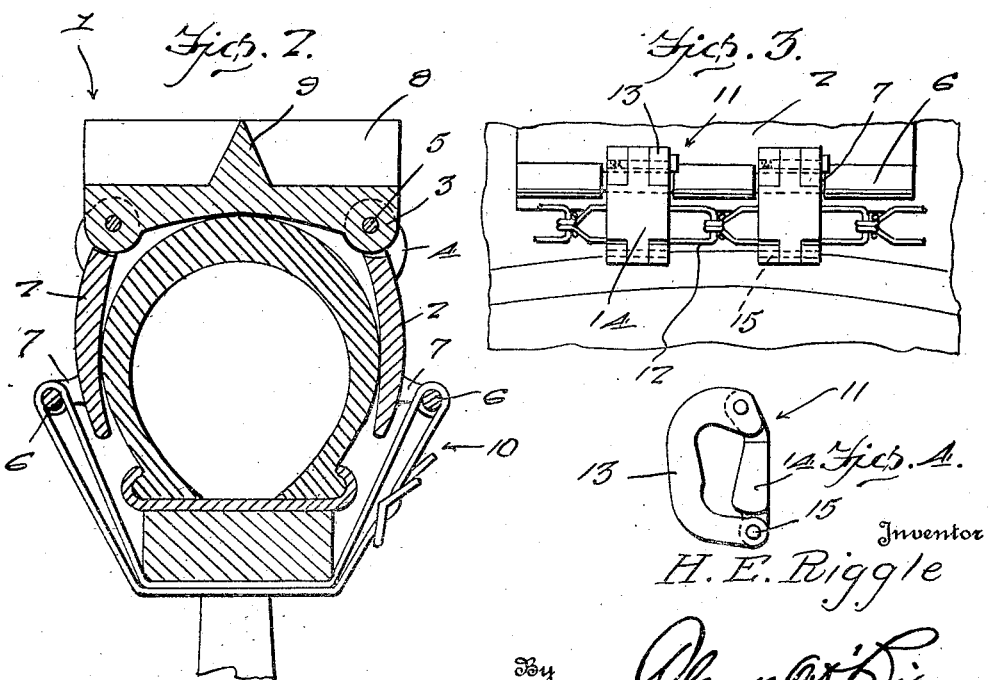
Inventor
H. E. Riggle Patented May 11, 1926.

1,584,651

UNITED STATES PATENT OFFICE.

HARVEY E. RIGGLE, OF VANDERGRIFT, PENNSYLVANIA.

MUD LUG.

Application filed March 19, 1925. Serial No. 16,692.

This invention relates to what is known in the art as a mud lug, the same being adapted for use upon automobile and other vehicle wheels for affording the desired traction in enabling the vehicle to extract itself from mud holes and the like.

It is the principal object of the invention to provide a mud lug composed of hingedly connected sections adapted to conform more accurately to the tire and to permit the same to be readily attached to the wheel at any convenient point.

Another object is to generally improve upon devices of this class by providing one of comparative simplicity and durability which is efficient in preventing slipping either in the direction of travel or sidewise.

Other features and advantages of the invention will become apparent from the following description and drawing.

In the accompanying drawing forming a part of this application and in which like numerals are employed to designate like parts throughout the same:

Figure 1 is a side view of a portion of an automobile tire and wheel showing a mud lug, constructed in accordance with the present invention, mounted thereon.

Figure 2 is a section taken approximately on the plane of the line 2—2 of Figure 1.

Figure 3 is a detail view showing a modified form of attaching means, and

Figure 4 is an end elevation of a particular kind of a connector between the mud lug and an anchoring chain used in some instances.

Referring to the drawing in detail, it will be seen that the improved mud lug is made up of a tread section 1 and duplicate side sections 2. As shown in Figure 2 the tread section is bowed transversely to conform to some extent to the tread of the tire which it contacts. Likewise, the side sections are of arcuate formation to conform more or less to the opposite side walls of the tire. The side and tread sections are provided at their meeting ends with complemental knuckles 3 and 4 through which pintles 5 are passed. Through this connection, the side sections are hingedly mounted from the tread sections. It will be noticed that the side sections are provided adjacent their bottom edges with right angularly disposed extensions 6 connected together by rods 7.

It is very desirable in a device of this kind to provide the tread member or section with efficient anti-slipping means such as will afford a tenacious traction. Special attention has been given the anti-slipping means in the present device by providing the tread sections with a pair of transversely disposed sharpened claws 8 between which a substantially V-shaped longitudinally disposed rib 9 extends. The pointed ends of the claws extend both in the same direction. This arrangement of anti-slipping means assures excellent traction in the direction of rotation of the wheel and at the same time prevents side slipping.

The particular construction of the aforesaid extensions 6 and intervening rod-like portions 7 permits the device to be connected to the wheel as shown in Figures 1 and 2 or as shown in Figures 3 and 4. Confining attention first to the first named figures it will be seen that a pair of straps 10 are employed, these being looped around the portions 7 and the buckles being fastened so that the straps extend cross-wise of the felly of the wheel and serves to maintain the mud lug securely in working position.

In Figures 3 and 4 however, a slightly different means is shown for maintaining the mud lug upon the wheel. Here, special clamps 11 are provided for connecting the device with the links of a pair of side chains 12. Each clamp comprises a substantially C-shaped part 13 provided with a pivoted closer 14 maintained in closed position by a removable pin 15. In this form of the invention the links of the side chains are embraced in the C-shaped members 13 of the clamp, and the closer elements 14 are moved to closed position and locked by the pins, thus securely connecting the mud lug to the ordinary side chains. Through this means it is possible to associate the mud lug with the ordinary anti-slipping chain in place.

It is thought that the foregoing description taken in connection with the accompanying drawing will enable persons skilled in the art to which the invention relates to obtain a clear understanding of the same, and that a more lengthy description is therefore unnecessary.

While the preferred embodiments of the invention have been shown and described, it is to be understood that changes coming within the field of invention claimed may be resorted to if desired.

Having thus described the invention, what I claim is:

In an attaching device for mud lugs wherein the latter includes a tread portion and opposed side members, of a series of spaced lugs extending laterally from each side member adjacent the bottom edge thereof and arranged in horizontal alignment, rods supported between the spaced lugs, and means co-operable with the rods for removably mounting the lug upon the wheel, said means comprising a plurality of clamps, each clamp comprising a substantially C-shaped member, and a pivoted closure link, said C-shaped member and the closure link being adapted to be detachably connected with one of the links of a side chain.

In testimony whereof I affix my signature.

HARVEY E. RIGGLE.